(12) United States Patent
Wilkie et al.

(10) Patent No.: US 6,333,385 B1
(45) Date of Patent: Dec. 25, 2001

(54) METHOD TO PRODUCE FLAME RETARDANT STYRENIC POLYMERS AND PRODUCT PRODUCED THEREBY

(75) Inventors: Charles A. Wilkie, Wauwatosa; Jin Zhu; Hongyang Yao, both of Milwaukee; Michael A. McKinney, Wauwatosa, all of WI (US)

(73) Assignee: Marquette University, Milwaukee, WI (US)

( * ) Notice: Subject to any disclaimer, the term of this patent is extended or adjusted under 35 U.S.C. 154(b) by 0 days.

(21) Appl. No.: 09/440,404

(22) Filed: Nov. 15, 1999

(51) Int. Cl.$^7$ ............................... C08F 8/02; C08F 8/10; C08F 12/36; C08K 5/49

(52) U.S. Cl. .................. 525/194; 525/332.2; 525/332.3; 526/293; 526/326; 526/334; 526/340; 526/347; 524/127; 524/139

(58) Field of Search ................................ 525/194, 332.2, 525/332.3; 524/127, 139; 526/293, 326, 334, 347, 340

(56) References Cited

U.S. PATENT DOCUMENTS

| | | |
|---|---|---|
| 4,172,858 | 10/1979 | Clubley et al. . |
| 4,248,976 | 2/1981 | Clubley et al. . |
| 5,084,522 * | 1/1992 | Frechet .................. 526/293 |
| 5,717,001 | 2/1998 | Books et al. . |
| 5,811,470 | 9/1998 | Prindle, Jr. et al. . |
| 5,916,978 | 6/1999 | Ao et al. . |

OTHER PUBLICATIONS

Babrauskas & Peacock (1992) *Fire Safety J.*, 18:255.
Bair, Harvey E., Thermal Analysis of Additives in Polymers, *Thermal Characterization of Polymeric Materials*, Second Edition, vol. 2, Academic Press, NY, pp. 2263, 2362–2363, 2417; 1997.
Brauman, *J. Polym. Sci.: Polym. Chem. Ed.*(1979), 17: 1129.
Gilman et al. (1997), *Fire and Matter*, 21:23.
Grassie and Gilks, *J. Polym. Sci.: Polym. Chem. Ed.* (1973), 11:1985.
Li, Jinming and Wilkie, Charles A., Improving the thermal stability of polystyrene by Friedel–Crafts chemistry, *Polymer Degradation and Stability*, (1997) 57:293–299.
Rabek and Lucki, *J. Polym. Sci.: Part A: Polym. Chem.* (1988), 26:2537.
Shriver & Drezdzon (1986) "The manipulation of air-sensitive compounds", $2^{nd}$ Ed.: *Wiley–Interscience*, pp. 168–209.
Wang et al., Cross–linking of polystyrene by Friedel–Crafts chemistry to improve thermal stability, *Polymer Degradation and Stability*, (1999) 64: 387–395.
Wang et al., Further studies on fire retardant polystyrene by Friedel–Crafts chemistry, *Polymer Degradation and Stability*, (1999) 0:1–6.

* cited by examiner

*Primary Examiner*—James J. Seidleck
*Assistant Examiner*—Olga Asinovsky
(74) *Attorney, Agent, or Firm*—Joseph T. Leone, Esq.; DeWitt Ross & Stevens S.C.

(57) ABSTRACT

Disclosed is a process for producing thermally stabilized styrenic polymers and products produced thereby wherein a pre-formed styrenic polymer is functionalized with a bifunctional Friedel-Crafts-type alkylation or acylation agent to yield a functionalized styrenic polymer. The functionalized polymer is admixed with a Friedel-Crafts-type catalyst, preferably a phosphate ester, and optionally a base, such that the functionalized polymer will experience inter- and intramolecular cross-linking reactions at elevated temperatures, thereby stabilizing the polymer from further thermal degradation.

35 Claims, 4 Drawing Sheets

METHOD TO PRODUCE FLAME RETARDANT STYRENIC POLYMERS AND PRODUCT PRODUCED THEREBY

FIELD OF THE INVENTION

The invention is directed to a method of producing styrenic polymers having improved thermal stability and flame retardant styrenic polymers produced using the method.

BACKGROUND

Cross-linking is a general strategy which has been investigated for some time now as a process to enhance the thermal stability of various polymers, including polystyrene (PS). The cross-linking strategy attempts to drive the introduction of cross-linkages into an otherwise non-crosslinked polymer matrix at elevated temperatures only (i.e., under conditions where the polymer is challenged by fire and/or high heat).

To date, this approach has met with only limited success. For example, in PS, Grassie and Gilks (1973) *J. Polym. Sci.: Polym. Chem. Ed.* 11:1985, used tin tetrachloride as a catalyst and p-di(chloromethyl)benzene in dichloroethylene as a cross-linking agent. A cross-linking reaction occurred under the conditions described in the paper, but the resultant cross-linked polymer has a lower thermal stability than the uncross-linked polymer itself. Similarly, Brauman (1979) *J. Polym. Sci.: Polym. Chem. Ed.* 17:1129, describes using antimony chloride as a catalyst in conjunction with various alkylating and acylating agents, and Rabek and Lucki (1988) *J. Polym. Sci.: Part A: Polym. Chem.* 26:2537, describe cross-linking PS at room temperature using aluminum trichloride as a catalyst. Both reactions, however, take place at a temperatures far too low to be useful to impart flame retardancy.

A primary concern in exploiting cross-linking as a flame retardant mechanism is that the cross-linking reaction should not occur under polymer processing conditions nor under the normal, operating environment in which the polymer is placed. Because the cross-linking reaction alters the physical properties of the polymer, to be practically useful the cross-linking reaction should have a sufficiently high barrier to activation so that the reaction does not auto-initiate under normal operational conditions. To be optimally useful as a flame-retardant mechanism, the cross-linking reaction should occur only when the finished polymer is exposed to open flame or heat which produces temperatures above the processing range of the polymer. Conversely, the activation barrier for the cross-linking reaction should not be higher than the degradation temperature of the polymer itself. Otherwise, the polymer degrades before the cross-linking reaction is initiated. In all of the efforts noted above, the cross-linking reaction described occurs at a temperature which is too low to be useful for thermal protection of the polymer.

The thermal degradation of PS homopolymer proceeds by two mechanisms: end-chain scission and random scission. The degradation products are styrene monomer, styrene oligomers, benzene, and toluene, all of which are highly flammable. The degradation commences at about 360° C. and is complete by about 450° C. Consequently, an optimal flame retardant/thermal stabilization system for styrenic polymers would remain inactive at temperatures at or below the processing temperature of PS (roughly about 200° C. to about 250° C.), and initiate cross-linking within the polymer matrix at temperatures greater than about 200° C. to 250° C. but not greater than about 360° C., the temperature at which pure PS begins to thermally degrade. Of course, the optimal temperature at which the cross-linking reaction is initiated should be tailored to the specific nature of the styrenic polymer at hand (e.g., PS homopolymer, PS-containing copolymer, etc.). For example, high-impact polystyrene (HIPS), a graft copolymer, begins to thermally degrade at about 300° C.

As reported by Li & Wilkie (1997) *Polym. Degrad. and Stability* 57:293–299, Friedel-Crafts chemistry, using 1,4-benzenedimethanol as a bifunctional alkylating agent and a zeolite catalyst, can yield cross-linkages within PS. However, the reactions leading to cross-linked products were performed in sealed vessels, where gaseous products are retained under high pressure and are available for further reaction. When the same reactions were conducted in a flowing nitrogen atmosphere, the diol was volatilized before it could react and cross-linking was not observed.

SUMMARY OF THE INVENTION

The present invention is a process to impart increased thermal stability to styrenic polymers and the resultant composition of matter. Specifically, the invention is directed to polymer compositions in which a bifunctional Friedel-Crafts-type alkylating or acylating agent is incorporated into a pre-formed styrenic polymer. In effect, the aromatic moieties of a pre-formed styrenic polymer are functionalized to contain a Friedel-Crafts-type alkylating or acylating agent. The functionalized styrenic polymer is then combined, either batch-wise or in continuous fashion, with a suitable Lewis or Brønsted-Lowry acid catalyst. The catalyst initiates (at a desired, elevated temperature, preferably above about 200° C.) the formation of inter- and intramolecular cross-linkages between the aromatic moieties present in the styrenic polymer, presumably via an electrophilic Friedel-Crafts-type alkylation/acylation mechanism, to yield a less volatile, more thermally stable, cross-linked, degraded polymer. Overall, the result is a styrenic polymer which, due to the introduction cross-linkages at elevated temperatures, is indistinguishable from conventional styrenic polymers during processing and at normally-encountered operational temperatures, but which degrades to a more thermostable, cross-linked polymer upon exposure to excessive heat.

One difficulty overcome by the present invention is that while Friedel-Crafts chemistry can be used to alkylate or acylate a styrene moiety under certain conditions, the reaction is quite capable of proceeding at only modest temperatures, so that with certain electrophiles, the reaction will occur under processing conditions. Another difficulty overcome by the invention is that because the alkylating/acylating agent is incorporated directly into the polymer itself, the agent cannot volatilize away from the bulk polymer before the cross-linking reaction can occur. Consequently, upon the exposure to sufficiently high heat, the alkylating/acylating agent is able to react, presumably via an electrophilic addition mechanism, to aromatic moieties present with the styrenic polymer.

The invention is drawn to a method of imparting increased thermal stability to styrenic polymers comprising reacting a pre-formed styrenic polymer with a bifunctional cross-linking reagent selected from the group consisting of:

wherein X and Y are alkylating and/or acylating agents and R is an aliphatic or aromatic group which links X and Y together. Specifically, R can be any aliphatic or aromatic group, preferably phenyl, naphthyl, anthryl, etc.; and X and Y are independently selected from the group consisting of halo, hydroxy, nitro, alkyl, alkenyl, haloalkyl, hydroxyalkyl, alkyloxy, alkyloxyalkyl, alkylcarbonyl, alkylcarbonylalkyl, alkyloxycarbonyl, alkyloxycarbonylalkyl, alkylcarboxy, alkylcarboxyalkyl, $C_1$ to $C_6$ dicarboxylates, substituted or unsubstituted phenyl or naphthyl, benzoate, mononitrobenzoate, polynitrobenzoate, phosphate, alkylphosphate, phenylphosphate, diphenylphosphate, alkyl-diaryl-phosphate, carbonate, phenyl carbonate, inorganic acid esters, mesylate, and tosylate.

In the preferred embodiment, the bifunctional cross-linking reagent is selected from the group consisting of:

wherein X and Y (and, where appropriate, the methylene to which X and Y are attached) are independently selected from the group consisting of hydrogen, halo, hydroxy, nitro, alkyl, alkenyl, haloalkyl, hydroxyalkyl, alkyloxy, alkyloxyalkyl, alkylcarbonyl, alkylcarbonylalkyl, alkyloxycarbonyl, alkyloxycarbonylalkyl, alkylcarboxy, alkylcarboxyalkyl, $C_1$ to $C_6$ dicarboxylates, substituted or unsubstituted phenyl or naphthyl, benzoate, nitrobenzoate, phosphate, alkylphosphate, phenylphosphate, diphenylphosphate, alkyl-diaryl-phosphate, carbonate, phenyl carbonate, inorganic acid esters, mesylate, and tosylate.

At a desired temperature, preferably at a temperature at about or below the processing temperature of the pre-formed polymer, one of X or Y reacts with aromatic moieties in the pre-formed styrenic polymer, to yield a functionalized styrenic polymer, while the other of X or Y remains available for further reaction. The functionalized polymer is then admixed with a Lewis and Brønsted-Lowry acid catalyst to yield a thermostabilized styrenic polymer composition. The thermostabilized polymer remains uncrosslinked at processing temperatures and at normal operating temperatures.

The catalyst catalyzes the reaction of the other of X or Y with remaining aromatic moieties in the functionalized polymer to yield a cross-linked product only upon exposure to elevated temperatures, preferably only at a temperature above the processing temperature of the pre-formed polymer, but below the temperature at which thermal degradation of the pre-formed polymer begins.

Optionally, a hindered amine light stabilizer (HALS) or other base may also be added to the composition to scavenge by-products of the cross-linking reaction, such as HCl.

The invention is also drawn to the resultant thermostabilized styrenic polymer composition.

Alternatively, the invention is also drawn to styrenic polymer compositions comprising a copolymer which includes a styrenic monomer (as that term is defined herein) and a comonomer selected from the group consisting of wherein
$R^1$ is selected from the group consisting of hydrogen and $C_1$-$C_4$ alkyl;
$R^2$ is selected from the group consisting of hydroxy, $C_2$-$C_6$ straight or branched alkene, fluoro, chloro, bromo, and iodo; and
$R^3$ is selected from the group consisting of fluoro, chloro, bromo, iodo and $C_1$-$C_6$ straight or branched alkyloxy.

To the copolymer is added, either during or after polymerization, an additive which is a Lewis or Brønsted-Lowry acid catalyst. When exposed to sufficient thermal energy, the catalyst initiates a cross-linking reaction between the comonomer units and the aromatic moieties in the copolymer, thereby cross-linking the copolymer and rendering it more thermostable than pure PS.

DETAILED DESCRIPTION

Abbreviations and Definitions

The following abbreviations and definitions are used herein:

"ABS"=acrylonitrile-butadiene-styrene block copolymer.
"AIBN"=azobis(isobutyronitrile).

"Alkyl/Alkenyl"=denotes straight, branched, and cyclic alkyl or alkenyl moieties of from one to six carbon atoms, unless otherwise noted.

"DPP"=2-ethylhexyl-diphenylphosphate.

"HAL"=hindered amine light stabilizer. A class of hindered amines marketed as light stabilizers for plastic formulations by numerous international suppliers, most notably BASF (Ludwigshafen, Germany) and ADK STAB (Taiwan, ROC). Representative HALS are marketed by ADK STAB, see catalog nos. LA 57, LA 62, LA 63, LA 67, LA 68LD, and LA 77.

"HIPS"=high-impact polystyrenes.

"HRR"=heat release rate.

"MLR"=mass loss rate.

"Processing Temperature"=the temperature at which a polymer is worked to form it into a desired shape. For example, when extruding pure PS, the processing temperature is generally around 200° C. Processing temperatures can vary quite widely depending upon the nature of the polymer and the type of processing employed (e.g., extrusion, blow-molding, etc.).

"PS"=polystyrene.

"SB"=styrene-butadiene copolymers, such as "K-RESIN"-brand styrene-butadiene copolymers (Phillips Petroleum, Bartlesville, Okla.).

"SBS"=styrene-butadiene-styrene block copolymers.

"Styrenic Monomer"=a vinyl aromatic monomer of the formula $H_2C=CR-Ar$, wherein R is a hydrogen or a $C_1-C_4$ alkyl and Ar is an aromatic moiety wherein the aromatic ring includes 6 to 14 carbon atoms (including alkyl or halo-substituted aromatics). Non-limiting examples of styrenic monomers include styrene (the preferred styrenic monomer) alpha-methylstyrene, ortho-methylstyrene, meta-methylstyrene, para-methylstyrene, para-ethylstyrene, isopropenyltoluene, isopropenylnaphthalene, vinyl toluene, vinyl naphthalene, vinyl biphenyl, vinyl anthracene, the dimethylstyrenes, t-butylstyrene, mono- and dichloro styrenes, mono- and dibromostyrenes, and the like.

"Styrenic Polymer"=any homopolymer, copolymer, block copolymer, graft copolymer, etc., containing a styrenic monomer as described herein. Expressly included within this definition are, without limitation, PS, HIPS, ABS, SBS, and SB.

"TGA"=thermogravimetic analysis.

Polymerization of Polymers and Copolymers

The styrenic polymers and copolymers used in the present invention are readily prepared by bulk or mass polymerization, via solution, suspension or emulsion polymerization techniques, in the same manner as in the polymerization of styrene homopolymer. These techniques are exceedingly well known and will not be described in great detail. Polymerization can be effected in the presence of free radical, cationic or anionic initiators, such as di-t-butyl peroxide, azobis(isobutyronitrile), di-benzoyl peroxide, t-butyl perbenzoate, dicumyl peroxide, potassium persulfate, aluminum trichloride, boron trifluoride, etherate complexes, titanium tetrachloride, n-butyllithium, 1-butyllithium, cumylpotassium,1,3-trilithiocyclohexane, and the like. The polymerization of styrene, alone, or in the presence of one or more comonomers copolymerizable with styrene is generally well known and need not be discussed in great detail. See the Examples for a description of free radical-initiated solution polymerization using AIBN as the initiator. Styrenic polymers having a molecular weight ($M_w$) of at least 1,000, preferably at least 50,000 and most preferably from about 150,000 to about 500,000, are used in the present invention. Although styrenic polymers outside these molecular weight ranges can be used, there is typically no economic advantage in so doing.

Bifunctional Friedel-Crafts-Type Agents

In one embodiment of the present invention, a styrenic polymer, preferably PS or HIPS, is functionalized with a bifunctional agent which can react under electrophilic Friedel-Crafts-type alkylation or acylation of the aromatic moieties present in the styrenic moiety. In the broadest and most literal sense, any bifunctional agent wherein the two functionalities can participate in Friedel-Crafts-type electrophilic addition to an aromatic group can be utilized in the present invention. It is much preferred that the bifunctional agent have two different functionalities (i.e., the agent is a hetero-bifunctional agent), although this is not required.

The invention is drawn to a method of imparting increased thermal stability to styrenic polymers comprising reacting a pre-formed styrenic polymer with a bifunctional cross-linking reagent selected from the group consisting of:

wherein X and Y are alkylating and/or acylating agents and R is an aliphatic or aromatic group which links X and Y together. Specifically, R can be any aliphatic or aromatic group, preferably phenyl, naphthyl, anthryl, etc.; and X and Y are independently selected from the group consisting of halo, hydroxy, nitro, alkyl, alkenyl, haloalkyl, hydroxyalkyl, alkyloxy, alkyloxyalkyl, alkylcarbonyl, alkylcarbonylalkyl, alkyloxycarbonyl, alkyloxycarbonylalkyl, alkylcarboxy, alkylcarboxyalkyl, $C_1$ to $C_6$ dicarboxylates, substituted or unsubstituted phenyl or naphthyl, benzoate, mononitrobenzoate, polynitrobenzoate, phosphate, alkylphosphate, phenylphosphate, diphenylphosphate, alkyl-diaryl-phosphate, carbonate, phenyl carbonate, inorganic acid esters, mesylate, and tosylate.

More preferred still is that the bifunctional agent itself contain an aryl moiety, preferably a phenyl or naphthyl moiety, connecting the two functionalities. The two functionalities can be located at any orientation on the aryl moiety, however, a 1,4 relationship (i.e., a para orientation) on a phenyl moiety is preferred.

The most preferred bifunctional agents are selected from the group consisting of wherein X and Y (and, where appropriate, the methylene group to which X and Y are attached) are independently selected from the group consisting of hydrogen, halo, hydroxy, nitro, alkyl, alkenyl, haloalkyl, hydroxyalkyl, alkyloxy, alkyloxyalkyl, alkylcarbonyl, alkylcarbonylalkyl, alkyloxycarbonyl, alkyloxycarbonylalkyl, alkylcarboxy, alkylcarboxyalkyl, $C_1$ to $C_6$ dicarboxylates (oxalate, malonate, succinate, etc.) substituted or unsubstituted phenyl or naphthyl (wherein the substitution is selected from any of the groups listed herein), benzoate, nitrobenzoate, polynitrobenzoate, phosphate, alkylphosphate, phenylphosphate, diphenylphosphate, alkyl-diaryl-phosphate, carbonate, phenyl carbonate, inorganic acid esters, mesylate, and tosylate. It is preferred that X and Y be different.

From among the listed compounds, the most preferred hetero-bifunctional agents are the compounds wherein X and the methylene carbon to which X is attached define a vinyl group and Y is hydroxy, hydroxylalkyl (i.e., an alcohol), alkyloxyalkyl (i.e., an ether), haloalkyl, and haloalkyloxyalkyl. Equally preferred hetero-bifunctional agents are those wherein X is haloalkyl, phosphate ester, nitrobenzoate ester, carbonate ester, mesylate or tosylate, and Y is hydroxyalkyl, alkyloxyalkyl, or one of the esters noted above. The most preferred homo-bifunctional agents are where X and Y are both p-nitrobenzoate, haloalkyl, hydroxyalkyl, or alkoxyalkyl.

To react the bifunctional agent with the pre-formed styrenic polymer, the polymer and the agent are intimately admixed, in either batch or continuous fashion, and heated to effect the reaction of one of X or Y with aromatic groups present in the pre-formed polymer. For reaction with pure PS as the pre-formed polymer, this temperature is generally about 200° C. In large-scale commercial applications, continuous addition of the bifunctional agent using suitable machinery, such as a jacketed extruder, is preferred.

The polymer and the bifunctional agent may also be reacted in solution phase using an appropriate solvent or solvent system for the chosen polymer and bifunctional reagent. For instance, where one or both of X and Y is an alkyl group, and the pre-formed polymer is PS, the two may be dissolved in toluene in the desired ratio and gently heated to cause reaction. The reaction temperatures in solution phase will differ quite significantly from those in solid phase. For example, where X and Y are both alkyl groups, the alkylation of PS in toluene will take place at about 100° C. The reaction temperature for any given combination of styrenic polymer and bifunctional agent is generally an empirical value which can be routinely determined and optimzed de novo for each combination.

The bifunctional agent can be added in amounts ranging from about 1% to about 99% by wt. of the pre-formed polymer. However, because only a relatively small number of cross-linkages are necessary to increase the thermostability of the ultimate polymer formulation, economics generally dictate that the agent be added in amounts ranging from about 2.5% to about 40% by wt.

Comonomers

The compositions according to the present invention contain a copolymer which contains a styrenic monomer, most preferably styrene, and a comonomer which includes a moiety which can act as a Friedel-Crafts-type alkylation or acylation agent. Preferred comonomers are selected from the group consisting of -continued wherein $R^1$ is selected from the group consisting of hydrogen and $C_1$–$C_4$ alkyl; $R^2$ is selected from the group consisting of hydroxy, $C_2$–$C_6$ straight or branched alkene, fluoro, chloro, bromo, and iodo; and $R^3$ is selected from the group consisting of fluoro, chloro, bromo, iodo and $C_1$–$C_6$ straight or branched alkylcarboxy. The most preferred comonomers are 4-vinylbenzyl alcohol and 4-vinylbenzyl chloride.

The comonomer can be present in a mass fraction ranging from 1% to 99% based on the total mass of the copolymer. Because only a small number of monomers need to form cross-linkages to yield a stabilized degradation product, it is preferred that the comonomer be present in a mass fraction generally ranging from about 2.5% to about 40% and more preferably still from about 10% to about 15% mass fraction. As noted in the Examples, control of the mass fraction of the comonomer can be determined empirically, or roughly predicted using reactivity ratios between the styrenic monomer and the comonomer, where available.

Catalysts

The catalyst used in the invention can be any catalyst that functions to catalyze Friedel-Crafts alklyation or acylation reactions, provided that the catalyst does not act to frustrate the efficient and safe production and storage of a high quality polystyrenic product. The favored catalysts are Lewis acid catalysts or Brønsted-Lowry acid catalysts, especially phosphate ester catalysts. The phosphate ester catalysts are thought to initiate catalysis after thermal decomposition to yield phosphoric acid—a Brønsted-Lowry acid and presumably the effective catalyst for the cross-linking reaction. Applicants, however, are not limited by this theory of catalysis.

Typical Lewis acid catalysts are transition metal halides, such as $AlCl_3$, $FeCl_3$, $AlBr_3$, $FeBr_3$, $SbCl_5$, $ZrCl_4$, $CuCl_2$, $CoCl_2$, $ZnCl_2$, $NiCl_2$, $CrCl_3$, $MnCl_2$, $SnCl_2$, and the like. The catalysts can be introduced into the composition by dry admixture after polymerization or by dissolving the styrenic polymer and the desired catalyst in a suitable solvent and then evaporating the solvent to yield an intimate commingling of the catalyst and polymer, or by any other means known to effect a uniform distribution of the catalyst with the polymer. The catalyst may, if the polymerization route chosen permits it, be introduced during polymerization itself. Introduction of the catalyst can be done by batch or in a continuous manner. Mixtures of Lewis acid catalysts can also be used.

From among the Lewis acid catalysts, more preferred are the cobalt and zinc-based catalysts. Of these, the most preferred are the cobalt and zinc halides, especially the bromides and chlorides. $CoCl_2$ and $ZnCl_2$ are most highly preferred, with $CoCl_2$ being the Lewis acid catalyst of choice.

From among the phosphate ester catalysts, most preferred are alkyl-diaryl-phosphates, especially the various phosphate esters marketed by Solutia (St. Louis, Mo.) under the trademark "SANTICIZER". Particularly preferred is 'SANTICIZER 141", which is predominately (>90%) 2-ethylhexyldiphenyl phosphate. Other phosphate ester catalysts which can be used in the invention include, without limitation, alkyl-diaryl-phosphates and dialkyl-aryl-phosphates, and 5,5,5',5',5",5"-hexamethyltris(1,3,2-dioxaphosphorinanemethan)amine 2,2',2"-trioxide ("XPM 1000"-brand, Monsanto).

As between the Lewis acid catalysts and the phosphate esters, the phosphate esters are preferred and 2-ethylhexyldiphenyl phosphate (DPP) is the most preferred catalyst for use in the present invention.

The catalyst is used in an amount which is sufficient to obtain the catalytic effect sought, namely the cross-linking of one styrenic monomer to another styrenic monomer upon the exposure to temperatures preferably above about 200° C., thereby introducing a cross-link into the otherwise non-cross-linked styrenic polymer. These catalytic amounts will depend on the activity of the catalyst and the nature of the styrenic monomer and comonomer, but will generally fall within the range of from about 0.2 to about 20% by wt. and preferably within the range of from about 1.0% to about 10% by wt., based on the weight of the styrenic polymer. The most active catalysts will be used in the lower amounts while the less active catalysts will be used in the higher amounts. For the preferred cobalt and zinc-based Lewis acid catalysts, it is preferred that they be used in amounts within the range of from about 1.0% to 3% by weight. Phosphate catalysts are preferably employed in higher concentrations, generally from about 5% to 10% by weight of the copolymer.

Acid Scavengers/Hindered Amine Light Stabilizers (HALS)

Optionally, to scavenge the products of the electrophilic addition at high temperatures, especially where a halide group is eliminated to yield HCl or HBr, a base may be added to the functionalized polymer along with the catalyst. Any base can be used to scavenge acids produced in the cross-linking reaction. The preferred bases are hindered amines which are compatible with styrenic polymers and include 1,8-bis(dimethylamino)naphthalene, 1,8-diazabicyclo{5,4,0}undec-7-ene, 4-hydroxypiperidine, 1-methyl-4-piperidine, 1-methyl-2-piperidine methanol, and 2,2,6,6-tetramethyl-4-piperidone. Commercial HALS, such as 2,2,6,6-tetramethyl-4-piperidinol, can also be used in the formulation. HALS are well known in the formulations industry and are generally not marketed as scavengers, but as light stabilizing agents. HALS are generally large, sterically-hindered, secondary cycloamines. Other typical commercially-available HALS which can be used in the present invention are as follows:

-continued

Both of these compounds are available from ADK STAB, Taiwan, see catalog nos. LA-77 and LA-57, respectively. Similar HALS can be obtained from BASF and others.

If included in the composition, the scavenger is added in a relatively small amount—less than about 2% by wt and preferably less than about 1% by wt.

Synergistic Flame Retardancy in Combination with Other Flame Retardants

This additives described herein also act synergistically with other, known flame retardant additives to improve the fire performance of styrenic polymers and copolymers. For example, the combination of from about 10% to about 20% (by wt.) of a bifunctional alkylating agent, together with the catalyst and hindered amine to consume evolved HCl with either polystyrene or high-impact polystyrene gives an n.c. classification in the UL-94 test. However, when this same amount of material is combined with a second flame retardant additive, triphenylphosphate, the UL-94 result is V-2.

UL-94 is a test defined by Underwriters Laboratories, Northbrook, Ill., which measures the flammability of plastic parts. Generally, the test measures the amount of time it takes a piece of plastic of defined dimensions to self-extinguish after being set aflame under controlled conditions. An "n.c." rating means "no classification"; the sample burns more rapidly than the classifications allow. The substantive classifications of the UL-94 test are as follows:

V-2, burn time less than 30 sec, but the sample drips.
V-1, burn time less than 30 sec, with no dripping.
V-0, burn time less than 10 sec, with no dripping.

The V-0 rating is best. (That is, the sample self-extinguishes quickly, with no dripping.)

As a further example, when from about 10% to about 20% (by wt.) of the bifunctional additive described herein, about 5% of the catalyst, and about 0.1% to about 0.2% of a hindered amine is combined with about 5% of decabromodiphenyloxide and about 2% antimony oxide, the UL-94 result is a V-0 rating. A V-0 rating can also be obtained by the combination of 12% decabromodiphenyloxide and 4% antimony oxide. Generally, by combining the bifunctional reagents and methodology described herein with a second, known flame retardant additive (preferably a halogen-based additive, more preferably still a bromine-based additive) the amount of the second additive required to achieve equivalent flame retardancy in the absence of the bifunctional agent is significantly reduced. Generally, the amount of the second flame retardant additive will range in from about 1% to about 10% by weight.

This synergistic aspect of the present invention is a significant advance because it reduces the content of the bromine fire retardant required to afford the same degree of flame retardancy by more than 50%. The preferred additive for this synergistic outcome is that in which X and Y are either both chlorides or one of X or Y is a chloride and the other is an alcohol. The R linking group is preferably an aromatic ring with a —$CH_2X$ and a —$CH_2Y$ at the para positions.

EXAMPLES

The following Examples are included herein solely to aid in a more complete understanding of the invention described and claimed herein. The Examples do not limit the scope of the disclosed invention in any fashion.

The sample of polystyrene which was used as the reference for thermal studies was acquired from Aldrich Chemical, Milwaukee, Wis. The molecular weight ($M_w$) is reported to be 280,000 daltons; the measured intrinsic viscosity is 84.1±8.0 ml/g. Also acquired from Aldrich was styrene, p-vinylbenzyl chloride, vinylbenzyl alcohol (mixture of isomers), polymerization inhibitor removal columns, and metal halides. Some phosphate ester compounds were acquired from Solutia Inc. under the trademarks "SANTICIZER" and "XPM 1000." Other dialky-aryl-phosphates and alkyl-diaryl-phosphates were produced in the laboratory using conventional methods.

The copolymers and blends of copolymers with additives described below were prepared as reported in Wang, Jiang, McKinney, and Wilke (1999) *Polym. Degrad. and Stabiliy* 64:387–394. The copolymer which was used contained a mass fraction of 15% alcohol functionalized comonomer; its measured intrinsic viscosity was 22.9±3.0 ml/g.

Copolymers were prepared by radical initiation in a chloroform-acetone solvent system using AIBN as the initiator. Homopolymers of polystyrene and copolymers varying between 1% and 99% comonomer were prepared. The preparation of the 10% 4-vinylbenzylchloride-containing copolymer is representative of all preparations:

Preparation of 10% 4-Vinylbenzyl Chloride/Styrene CoPolymer

In a 250 mL three-neck round-bottom flask were placed 90 mL of chloroform, 10 mL of 0.20 M AIBN in acetone, 9.0 mL of styrene (inhibitor removed), and 1.0 mL of p-vinylbenzyl chloride. The mixture was refluxed for 24 h. At the conclusion of the reaction, the solution was cooled and the solvent was removed on a rotary evaporator and the sample was dried in a vacuum oven at 90° C. for 2 h.

The resulting polymers were analyzed for either chlorine or oxygen, depending upon the type of copolymer which had been produced, and these were used to determine how the compositions compared with that expected based upon the amount of starting materials charged to the reaction vessel and the available reactivity ratios for styrene and the respective comonomer. (See Brandrum & Immergut (1989) Polymer Handbook, $3^{rd}$ ed., vol. 225, New York: Wiley Press.) For the copolymers containing smaller amounts of comonomer (roughly <10% comonomer, the experimental compositions are quite close to the predicted values.

Reaction of Pre-Formed Polymer (PS) with Bifunctional Agent

Here, the reaction of p-vinylbenzyl alcohol is typical:

In a 250 mL three-neck flask, 1 g p-vinylbenzyl alcohol, inhibitor removed, was mixed 10 g (10% by wt.) with PS in toluene (q.s.). The mixture was refluxed for 24 h at 100° C. At the conclusion of the reaction, the solution was cooled and the solvent was removed on a rotary evaporator and the sample was dried in a vacuum oven at 90° C. for 2 h.

The resulting functionalized polymer was analyzed for oxygen content and found to contain the expected amount of oxygen for a polystyrene polymer functionalized by the addition of vinylbenzyl alcohol.

Cross-Linking Using Various Bifunctional Agents

The table which follows is a list of bifunctional Friedel-Crafts-type bifunctional agents which have been synthesized and reacted with PS (5% by wt unless otherwise noted), subjected to the indicated temperature, and then examined for the presence of cross-linking.

Results of the Tests of Bifunctional Agents

| Bifunctional Agent | Catalyst Present | Temperature, ° C. | Cross-linking |
|---|---|---|---|
| $(PhO)_2P(O)OCH_2$—Ph—$CH_2OH$ | No | 200 | Yes |
| $(PhO)_2P(O))CH_2$—Ph—$CH=CH_2$ | No | 200 | Yes |
| $(PhO)_2P(O)OCH_2PhCH_2OP(O)(OPh)_2$ | No | 200 | Yes |
| $TsO(CH_2)_4OTs$ | No | 200 | Yes |
| $TsOCH_2CH_2$—Ph—$CH=CH_2$ | No | 200 | Yes |
| $TsOCH_2CH_2CH_2$—Ph—$CH=CH2$ | No | 200 | Yes |
| $TsOCH_2$—$C_6H_{10}$—$CH_2OTs$ | No | 200 | Yes |
| $MsOCH_2C_6H_{10}$—$CH_2OMs$ | No | 200 | Yes |
| p—$NO_2$—Ph—C(O)—$OCH_2$—Ph-$CH_2OH$ | No | 250 | No |
|  | Yes | 250 | Yes |
| p—$NO_2$—Ph—C(O)—$OCH_2$—Ph—$CH_2O$—C(O)—Ph—p—$NO_2$ | No | 250 | No |
|  | Yes | 250 | Yes |
| $NO_2$—O—$CH_2$—Ph—$CH=CH_2$ | No | 200 | No |
|  | Yes | 250 | Yes |
| $ClCH_2$—Ph—$CH=CH_2$ | No | 200 | Yes |
| $ClCH_2$—Ph—$CH(OH)CH_3$ | No | 200 | No |
| (after ½h, @ 200° C.)* | No | 250 | Yes |
| (after ½h, @ 200° C.)* | Yes | 250 | Yes |
| $ClCH_2Ph$—$CH_2$—OH | No | 200 | No |
| (after ½h, @ 200° C.)* | No | 250 | Yes |
| (after ½h, @ 200° C.)* | Yes | 250 | Yes |
| $HOCH_2$—Ph—$CH=CH_3$ | No | 200 | No |
|  | Yes | 250 | Yes |
| $HOCH_2CH_2$—Ph—$CH=CH_2$ | No | 250 | No |
|  | Yes | 250 | No |
| $HOCH_2CH_2CH_2$—Ph—$CH=CH_2$ | No | 250 | No |
|  | Yes | 250 | No |
| CHO—Ph—CHO | No | 250 | No |
|  | Yes | 250 | No |
| $CH_3O$—$CH_2$—Ph—$CH=CH_2$ | No | 200 | No |
| (after 30 min, @ 200° C.) | Yes | 250 | Yes |
| $(EtO)_2CH$—Ph—CHO | No | 250 | No |
|  | Yes | 250 | No |
| $CH_3$—C(O)—Ph—C(O)—$CH_3$ | No | 250 | No |
|  | Yes | 250 | No |
| $CH_3$—C(O)—O—Ph—$CH=CH_2$ | No | 250 | No |
|  | Yes | 250 | No |
| $PhCH_2O$—C(O)—$OCH_2$—Ph | No | 250 | No |
|  | Yes | 250 | No |
| o—CHO—Ph—$OCH_2$—$CH=CH_2$ | No | 250 | No |
|  | Yes | 250 | No |
| CHO—Ph—$CH=CH_2$ | No | 250 | No |
|  | Yes | 250 | No |
| $CH_2=CH$—Ph—$CH_2O$—C(O)—$OCH_2Ph$—$CH=CH_2$ | No | 250 | na |
|  | Yes | 250 | na |
| $HOCH_2Ph$—$CH_2O$—C(O)—$OCH_2CH_3$ | No | 250 | No |
|  | Yes | 250 | na |
| $Me_3Si$—$OCH_2$—Ph—$CH=CH_2$ | No | 200 | na |
|  | Yes | 250 | na |
| $CH_2=CH$—Ph—$CH_2O$—C(O)—$OCH_3$ | No | 100 | No |
|  | No | 150 | No |
|  | No | 200 | No |
|  | No | 250 | Yes |
|  | Yes | 250 | Yes |
| (after 1 h, 10 wt % @ 100° C.)* | Yes | 250 | No |
| $CH_2=CH$—Ph—$CH_2O$—C(O)—OPh | No | 100 | No |
|  | No | 150 | Yes |
|  | No | 200 | Yes |

-continued

| Bifunctional Agent | Catalyst Present | Temperature, °C. | Cross-linking |
|---|---|---|---|
| | No | 250 | Yes |
| | Yes | 250 | Yes |
| (after 1 h, 10 wt % @ 100° C.)* | Yes | 250 | No |
| (after 24 h, 25 wt %, @ 110° C. in toluene)* | No | 250 | No |
| (after 24 h, 25 wt % @ 110° C. in toluene)* | Yes | 2S0 | No |
| Ph—O—C(O)—O—CH$_2$—Ph—CH$_2$OH | No | 250 | No |
| | Yes | 250 | Yes |
| | No | 200 | No |
| (after 1 h, 10 wt %, @ 200° C.)* | Yes | 250 | No |
| (after 6 h, 18 wt %, @ 140° C.)* in xylenes | Yes | 250 | Yes |
| (after 24 h, 30 wt %, @ 140° C.)* in xylenes | Yes | 2S0 | Yes |
| EtO-C(O))CH$_2$-Ph-CH$_2$OH | Yes | 250 | Yes |
| | No | 200 | No |
| (after 1 h, 10 wt %, @ 200° C.)* | Yes | 250 | No |

*All entries refer to a prior treatment under the experimental conditions noted, followed by recovery and spectroscopy, before reaction under the conditions of the entry In some entries, the aromatic ring of polystyrene was alkylated at temperatures near 100° C. in toluene solution, the the functionalized polymer isolated, and then shown that it will cross-link at 250° C. This has been shown specifically in the cases of the phosphate/vinyl; phosphate/alcohol; chloride/alcohol; and chloride/vinyl bifunctional agents. In each case the first-named component undergoes Friedel-Crafts-teyp alkylation at 100° C. and the functionalized polymer has been isolated and recovered and characterized. This recovered polymer was then heated at 250° C. in the presence of the catalyst and it was found that the polymer is now cross-linked. In the case of the chloride/vinyl agent, cross-linking also occurs at 200° C. Those entries which contain a phosphate also are observed to facilely cross-link at 200° C. This is thought to be due to the incomplete removal of the acidic residue which is produced upon addition of the phosphate.

Thermolysis Studies

Thermolysis studies were performed on a high vacuum line. A 50 ml round bottom flask was charged with about 200 mg of sample, containing either pure copolymer, or a solvent-mixed blend, and a mass fraction of 10% cobalt chloride. The sample was heated in an oil bath to 250° C., for 2 h under flowing nitrogen. To ensure that water did not escape from the vacuum line, the U-tube traps were cooled to −78° C. using a dry ice-acetone slurry. At the conclusion of the heating time, the vessel was allowed to cool to room temperature, the nitrogen inlet was closed, and the stopcock to the high vacuum line opened so that any gases which evolved during the course of the reaction were trapped. After a standard vacuum line distillation (see Shriver & Drezdzon (1986) "The manipulation of air-sensitive compounds" $2^{nd}$ ed.: Wiley-Interscience, p. 168–209), the infrared spectra of the gases were obtained.

Thermogravimatric analysis (TGA) was performed on an Omnitherm 1000 unit under a flowing nitrogen atmosphere at a scan rate of 10° C. or 20° C. per minute. All TGA data is the average of three determinations; the error bars on the temperatures are +/−3° C.

Cone calorimetry was carried out using the apparatus at the National Institute of Standards and Technology. See Babrauskas & Peacock (1992) *Fire Safety J.* 18:255. Peak heat release rate, mass loss rate and specific extinction area (SEA) data, measured at 35 kW/m$_2$, are reproducible to within ±10% (σ). The carbon monoxide and heat of combustion data are reproducible to within ±10% (σ). The uncertainties for the Cone Calorimeter are based on the statistics derived from four replicate ruins of several representative samples. The uncertainty in the measurements in the Cone data is shown in each plot as an error bar on the data for the copolymer. The heat release rate data plots on all samples are based on the average of two to four replicates. The tests were performed on samples which were solvent blended. Cone samples were prepared by compression molding the powdered samples into 75 mm diameter by 4 mm thick disks, using a Carver press with a heated mold.

To study the condensed phase decomposition processes we conducted pyrolysis experiments in a radiative gasification apparatus as described by Gilman et al (1997) *Fire and Mater.* 21:23. The gasification apparatus allows visual observation and study of mass and heat transfer processes during pyrolysis, in a nitrogen atmosphere, of samples identical to those used in the Cone Calorimeter at a constant heat flux. This is done without complications from gas phase combustion, such as heat feedback and obscuration of the sample surface from the flame. The uncertainty in the measurements in the gasification data is shown in each plot as an error bar.

Oxygen index measurements were performed with a home-made apparatus using bottom ignition.

TGA

Figure 1:
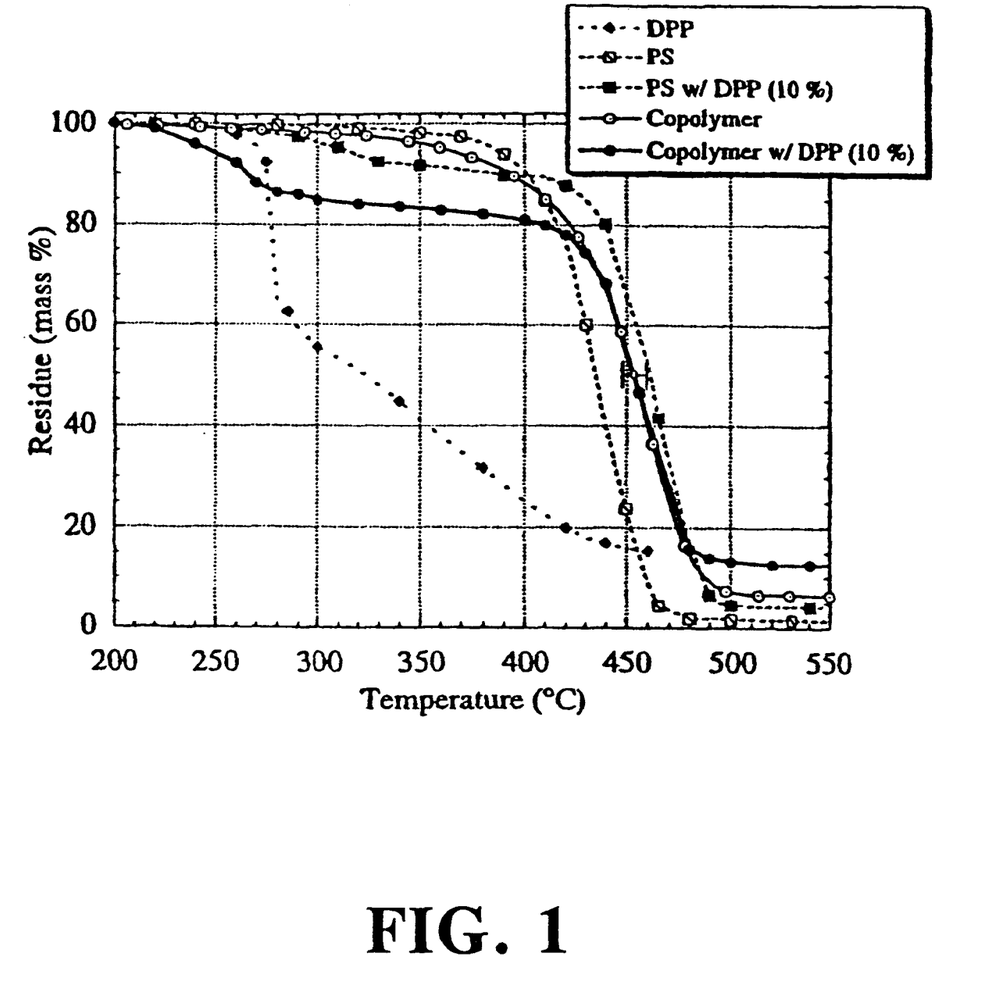
FIG. 1 is a TGA plot of PS, DPP, a blend of polystyrene with 10% by wt. DPP, and a blend of poly(styrene-co-4-vinylbenzyl alcohol) (10% mass fraction 4-vinylbenzyl alcohol) with 10% by wt. DPP.

The degradation of the benzyl alcohol-containing copolymer commences at a lower temperature when it is thermolyzed alone, than when it is thermolyzed in the present of DPP. To determine the effect that the phosphate ester had on the degradation of polystyrene we analyzed the thermal degradation using TGA. FIG. 1 shows the TGA curves for DPP, PS, polystyrene with DPP (10% by wt.), and the copolymer (10% mass fraction benzyl alcohol) with DPP (mass fraction 10%). One can see that the TGA curves for both PS and the copolymer are changed by the presence of DPP. In addition to the enhanced thermal stability for the copolymer with DPP, the thermal stability of the PS is also improved. Notably, the copolymer gives a residue yield of 12%. This is greater than the theoretical residue yield of 1.8%, which is observed in the PS with DPP. This Example shows that by incorporating an alkylating agent into the styrenic polymer itself, the amount of nonvolatile residue is increased, thereby indicating that the sample is more thermostable than pure PS.

Radiative Gasification

Figure 2:
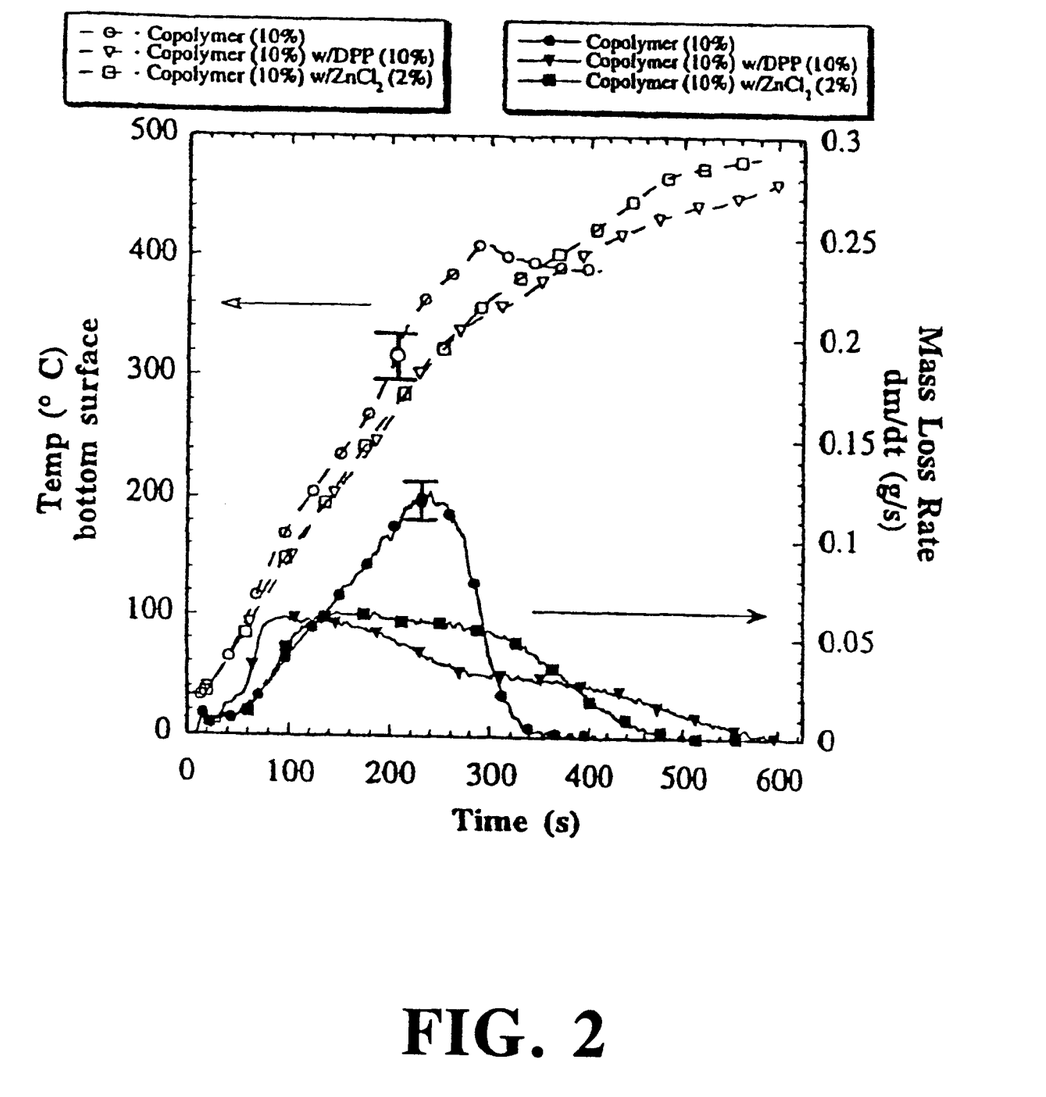
FIG. 2 is a plot of Mass Loss Rate (MLR) and bottom surface thermocouple data from gasification experiments performed at a heat flux of 40 kW/m² in nitrogen for poly(styrene-co-4-vinylbenzyl alcohol) (10% mass fraction 4-vinylbenzyl alcohol) with DPP (10% by wt) and with zinc chloride (2% by wt.).

Using the radiative gasification apparatus noted above, a thermocouple was embedded in the bottom surface of several samples to monitor the bottom surface temperature, and mass loss rate (MLR) data was obtained using a load cell. The experiment was also recorded with a video camera. FIG. 2 shows the MLR and thermocouple data from the gasification experiments for the benzyl alcohol copolymer (10% mass fraction benzyl alcohol), its combination with DPP (10% by wt), and zinc chloride (2% by wt.).

The DPP-copolymer combination shows one peak in the MLR data at about 80 sec. The MLR of the copolymer-additive combination is higher than that for the pure copolymer up to 120 s. This effect may be from degradation and volatilization of the additive. This hypothesis is supported by the result seen for ZnCl$_2$: where the early MLR peak is absent. Hence, the early mass loss rate is presumably due to the presence of the DPP. However, another process is also occurring at the same time: the rapid charring of the sample, which is presumably being initiated by the cross-linking reaction mentioned above. Initial char formation is readily visible at 30 s for the copolymer with the DPP sample. The entire copolymer/DPP sample is covered by char at 100 s. At 250 s into the degradation, the bottom surface temperature is 350° C. for the pure copolymer; while at the same time the bottom surface temperature in 40° C. lower for both of the copolymer-additive combinations. Clearly, this Example shows that the char is insulating the underlying material. This lower sample temperature results in a lower MLR (see FIG. 2).

There is a plateau in the MLR data of the copolymer/DPP sample which begins at about 300 sec. In the videotape of the experiment, it can be seen that the char appears to have cracked at this point, thereby exposing virgin material to the external heat flux, and allowing the decomposition gases to escape. If one compares the peak MLR's, one sees that the peak MLR for the pure copolymer is 2.5 times that for the copolymer with DPP. The gasification experiment has also been performed on pure polystyrene; the results are essentially the same as those observed for the copolymer in the absence of additive. Char formation is not observed in the degradation of either the pure copolymer or pure PS.

Figure 3:
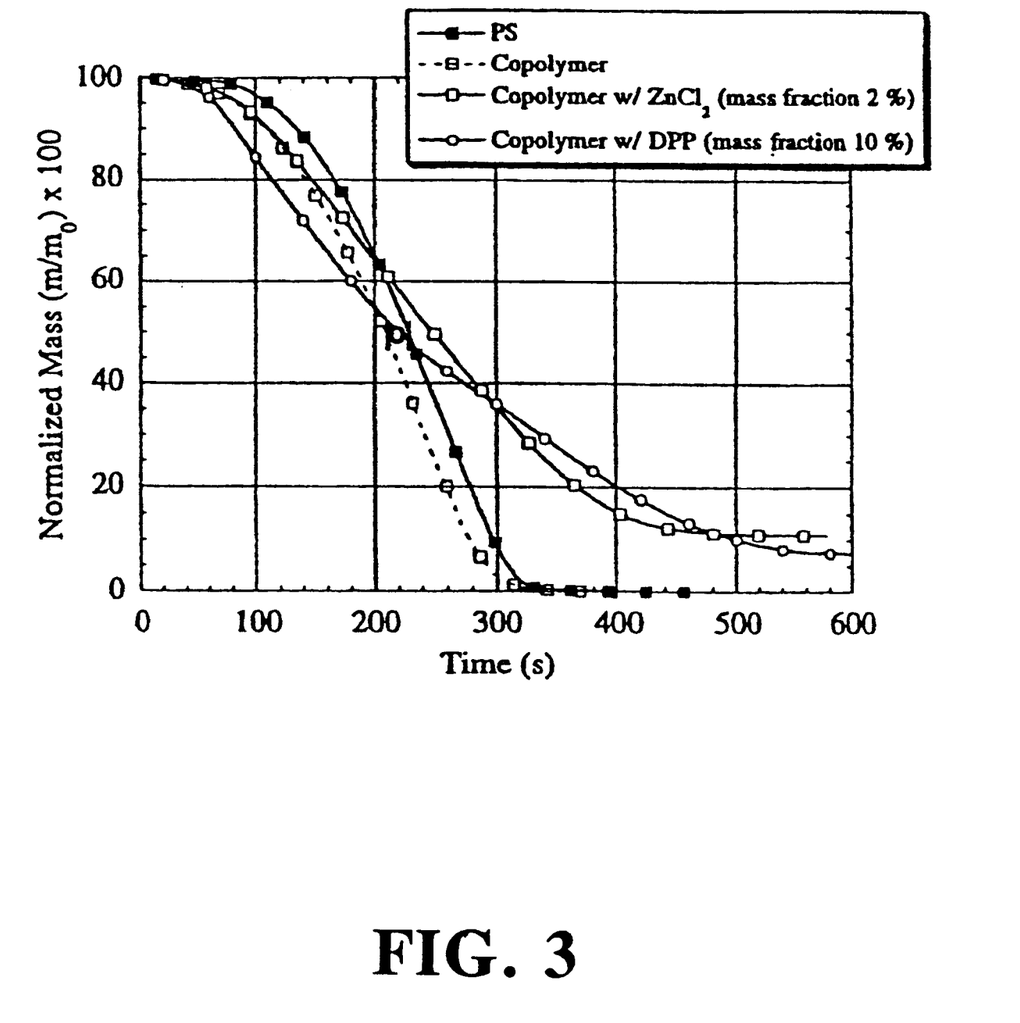
FIG. 3 is a plot showing the loss of mass for PS, an alcohol-containing PS copolymer and blends of the alcohol-containing PS copolymer with DPP (10% by wt.) and zinc chloride (2% by wt.) from a radiative gasification experiment.

FIG. 3 shows a plot of the mass which remains as a function of heating time for two controls, polystyrene, and 10% benzyl alcohol copolymer, and for the copolymer with the two additives, zinc chloride (2% by wt.) and DPP (10% by wt.). The initial mass loss is largest for the copolymer with DPP; presumably, because of the presence of the volatile DPP and the fact that water will be evolved as the Friedel-Crafts reaction proceeds. Both pure PS and the alcohol-containing copolymer completely volatilize by 300 sec. In contrast, the two samples of the copolymer with Friedel-Crafts additives give between 10 and 20% char near the end of the experiment.

This experiment shows the formation of char and non-volatile residues at high temperatures for the subject compositions, both indications of their increased thermal stability as compared to pure PS.

Cone Calorimetry

Cone calorimetry was carried out at a heat flux of 35 kW/m$^2$; each sample was determined two times and the results reported below are the average of these two determinations.

Figure 4:
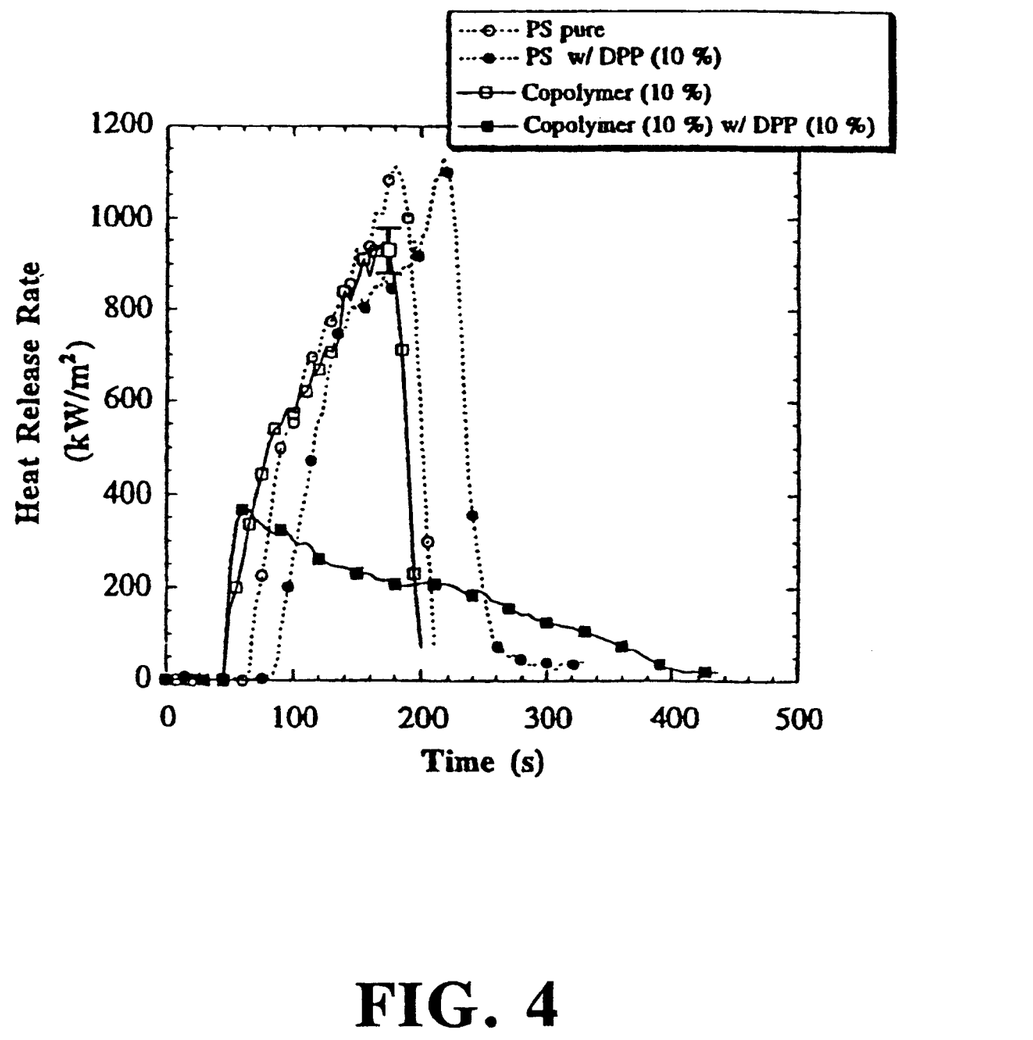
FIG. 4 is a plot showing heat release rates for pure PS, PS with DPP, poly(styrene-co-4-vinylbenzyl alcohol), and poly(styrene-co-4-vinylbenzyl alcohol) with DPP at a heat flux of 35 kW/m²

FIG. 4. shows the heat release rate for the benzyl alcohol copolymer (10%), and the copolymer containing DPP. Clearly, there is a reduction in peak heat release rate (HRR) in the presence of the additive.

Cone Calorimetry for Polystyrene, Poly(styrene-co-4-vinylbenzyl Alcohol), and These Two Polymers Combined with 10% of 2-ethylhexyl-diphenylphosphate

|  | Ps | Ps +DPP | Copolymer | Copolymer +additive |
|---|---|---|---|---|
| Time to ignition(s) | 52 | 55 | 37 | 36 |
| Time to peak HRR(s) | 162 | 190 | 155 | 410 |
| Peak HRR (kW/m) | 1160 | 1154 | 947 | 374 |
| Peak mass loss (g/s m$^2$) | 38 | 31 | 32 | 17 |
| Total heat (MJ/m$^2$) | 102 | 190 | 92 | 80 |
| Mass loss rate (g/s m$^2$) | 29 | 29 | 26 | 11 |
| H$_c$ (MJ/kg) | 29 | 27 | 27 | 26 |
| CO yield (kg/kg) | 0.09 | 0.11 | na[a] | na | a: data not available

Furthermore, the DPP does not effect a change in the flammability of PS, i.e., the benzyl alcohol functionality must be present for DPP to be effective. As observed in the gasification experiments, the mass loss rate and peak mass loss are significantly lower for the copolymer with DPP. Significant char formation in the Cone experiments were observed, in the same fashion as in the gasification apparatus and in the TGA.

Cone calorimetry was also carried out on mixtures of PS and HIPS with a bifunctional Friedel-Crafts-type cross-linking agent. Results of peak heat release rates for various formulations are shown below:

| Polymer | Bifunctional Agent, Wt % | HALS Wt % | DPP Wt % | Peak HRR kW/m$^2$ |
|---|---|---|---|---|
| PS | None, 0 | 0.00 | 0.00 | 1017 |
| PS | HMBC, 10 | 0.10 | 0.00 | 530 |
| PS | HMBC, 10 | 0.10 | 5.00 | 365 |
| PS | DCPX, 10 | 0.10 | 0.00 | 570 |
| PS | DCPX, 10 | 0.10 | 5.00 | 512 |
| PS | PVBC, 10 | 0.10 | 0.00 | 577 |
| PS | PVBC, 10 | 0.10 | 5.00 | 578 |
| HIPS | None, 0 | 0.00 | 0.00 | 915 |
| HIPS | HMBC, 10 | 0.00 | 5.00 | 352 |
| HIPS | DCPX, 10 | 0.00 | 5.00 | 532 |
| HIPS | PVBC, 10 | 0.00 | 5.00 | 614 |

HMBC = hydroxymethylbenzyl chloride
DCPX = α,α'-dichloro-p-xylene
PVBC = poly(vinylbenzyl chloride)
HALS = 2,2,6,6-tetramethylpiperidinol
HRR = heat release rate
DPP = 2-ethylhexyldiphenyl phosphate The peak heat release rates are significantly reduced by the presence of the additive. In addition, significant quantities of char are observed. UL-94 measurements were carried out on these same compositions. Only one composition, PS+DCPX, gave a V-2 rating, while all others were N.C. Nonetheless, the observations were that dripping was greatly reduced and the formation of significant char was noted.

Oxygen Index Measurement

Oxygen index measures ease of extinction of a fire, while cone calorimetry measures the heat release rate. Because different parameters are measured, agreement between the two techniques is not necessarily expected. The oxygen index, using bottom ignition, for the copolymer containing no additives is 17 while that for the benzyl alcohol copolymer (10% mass fraction) with 10% DPP is 21. Bottom ignition is a much more stringent test than the normal top ignition because during bottom ignition, the sample is engulfed by the fire, while in top ignition, the fire is above the bulk of the sample. As a general rule one can add 3 to 4 points onto the bottom ignition value to approximate the top ignition value. Thus this measurement clearly shows improvement in the ease of extinction of the burning copolymer in the presence of the additive.

What is claimed is:

1. A method of imparting increased thermal stability to styrenic polymers comprising:

(a) reacting a pre-formed styrenic polymer with a bifunctional cross-linking reagent selected from the group consisting of:

X—R—Y wherein R is an aromatic linking group; and
   X and Y are independently selected from the group consisting of halo, hydroxy, nitro, alkyl, alkenyl, haloalkyl, hydroxyalkyl, alkyloxy, alkyloxyalkyl, alkylcarbonyl, alkylcarbonylalkyl, alkyloxycarbonyl, alkyloxycarbonylalkyl, alkylcarboxy, alkylcarboxyalkyl, C$_1$ to C$_6$ dicarboxylates, substituted or unsubstituted phenyl or naphthyl, benzoate, mononitrobenzoate, polynitrobenzoate, phosphate, alkylphosphate, phenylphosphate, diphenylphosphate, alkyl-diarylphosphate, carbonate, phenyl carbonate, inorganic acid esters, mesylate, and tosylate, at a first temperature wherein one of X or Y reacts with aromatic moieties in the pre-formed styrenic polymer to yield a functionalized styrenic polymer; and then (b) admixing the functionalized styrenic polymer with an acid catalyst capable of catalyzing Friedel-Crafts alkylation or acylation reactions, which thereby catalyzes reaction of the other of X or Y with remaining aromatic moieties in the functionalized polymer as a second temperature, wherein the second temperature is higher than the first temperature.

2. The method of claim 1, wherein in step (a) the pre-formed styrenic polymer is reacted with a bifunctional cross-linking reagent wherein X and Y are the same.

3. The method of claim 1, wherein in step (a) the pre-formed styrenic polymer is reacted with a bifunctional cross-linking reagent wherein X and Y are different.

4. The method of claim 1, wherein in step (a) the pre-formed styrenic polymer is reacted with a bifunctional cross-linking reagent wherein one of X or Y is a vinyl group and the other of X or Y is selected from the group consisting of hydroxy, hydroxylalkyl, alkyloxyalkyl, haloalkyl, and haloalkyloxyalkyl.

5. The method of claim 1, wherein in step (a) the pre-formed styrenic polymer is reacted with a bifunctional cross-linking reagent wherein one of X or Y is haloalkyl, phosphate ester, nitrobenzoate ester, carbonate ester, mesylate or tosylate and the other of X or Y is selected from the group consisting of hydroxy, hydroxylalkyl, alkyloxyalkyl, haloalkyl, and haloalkyloxyalkyl.

6. The method of claim 1, wherein in step (a) the pre-formed styrenic polymer is reacted with a bifunctional cross-linking reagent wherein X and Y are both p-nitrobenzoate, haloalkyl, hydroxyalkyl, or alkoxyalkyl.

7. The method of claim 1, wherein in step (a) an amount of cross-linking reagent of from about 1% to about 99% by wt. of the pre-formed polymer is reacted.

8. The method of claim 1, wherein in step (a) an amount of cross-linking reagent of from about 2.5% to about 40% by wt. of the pre-formed polymer is reacted.

9. The method of claim 1, wherein in step (a) the first temperature is not greater than about 250° C.

10. The method of claim 1, wherein in step (a), the first temperature is not greater than about 200° C.

11. The method of claim 1, wherein in step (b), the second temperature is greater than about 250° C.

12. The method of claim 1, wherein in step (b), the functionalized polymer is admixed with a catalyst which is an alkyl-diaryl phosphate, a dialkyl-aryl-phosphate, or 5,5,5',5',5",5"-hexamethyltris(1,3,2-dioxaphosphorinanemethan)amine 2,2',2"-trioxide.

13. The method of claim 1, wherein in step (b), the functionalized polymer is admixed with a catalyst selected from the group consisting of 2-ethylhexyldiphenyl phosphate and 5,5,5',5',5",5"-hexamethyltris(1,3,2-dioxaphosphorinanemethan)amine 2,2',2"-trioxide.

14. The method of claim 1, further comprising the step of (c) admixing the functionalized styrenic polymer with a base.

15. The method of claim 14, wherein in step (a) the pre-formed styrenic polymer is reacted with a bifunctional cross-linking reagent wherein X and Y are the same.

16. The method of claim 14, wherein in step (a) the pre-formed styrenic polymer is reacted with a bifunctional cross-linking reagent wherein X and Y are different.

17. The method of claim 14, wherein in step (a) the pre-formed styrenic polymer is reacted with a bifunctional cross-linking reagent wherein one of X or Y is a vinyl group and the other of X or Y is selected from the group consisting of hydroxy, hydroxylalkyl, alkyloxyalkyl, haloalkyl, and haloalkyloxyalkyl.

18. The method of claim 14, wherein in step (a) the pre-formed styrenic polymer is reacted with a bifunctional cross-linking reagent wherein one of X or Y is haloalkyl, phosphate ester, nitrobenzoate ester, carbonate ester, mesylate or tosylate and the other of X or Y is selected from the group consisting of hydroxy, hydroxylalkyl, alkyloxyalkyl, haloalkyl, and haloalkyloxyalkyl.

19. The method of claim 14, wherein in step (a) the pre-formed styrenic polymer is reacted with a bifunctional cross-linking reagent wherein X and Y are both p-nitrobenzoate, haloalkyl, hydroxyalkyl, or alkoxyalkyl.

20. The method of claim 14, wherein in step (a) an amount of cross-linking reagent of from about 1% to about 99% by wt. of the pre-formed polymer is reacted.

21. The method of claim 14, wherein in step (a) an amount of cross-linking reagent of from about 2.5% to about 40% by wt. of the pre-formed polymer is reacted.

22. The method of claim 14, wherein in step (a) the first temperature is not greater than about 250° C.

23. The method of claim 14, wherein in step (a), the first temperature is not greater than about 200° C.

24. The method of claim 14, wherein in step (a), the second temperature is greater than about 250° C.

25. The method of claim 14, wherein in step (A), the functionalized polymer is admixed with a catalyst which is an alkyl-diaryl phosphate.

26. The method of claim 14, wherein in step (b), the functionalized polymer is admixed with a catalyst selected from the group consisting of alkyl-diaryl-phosphates, dialkyl-aryl-phosphates, and 5,5,5',5',5",5"-hexamethyltris(1,3,2-dioxaphosphorinanemethan)amine 2,2',2"-trioxide.

27. The method of claim 14, further comprising the step of (d) admixing the functionalized styrenic polymer with a flame-retardant additive.

28. The method of claim 27, wherein the second flame retardant additive is selected from the group consisting of halogen-based flame retardant additives and phosphate-based flame-retardant additives.

29. The method of claim 28, wherein the halogen-based flame retardant additive is bromine-based.

30. The method of claim 27, wherein the second flame retardant additive is added in an amount of from about 1% to about 10% by weight.

31. The method of claim 1, wherein R is phenyl or naphthyl.

32. A functionalized, thermostabilized styrenic polymer composition produced according to the method of claim 1.

33. A functionalized, thermostabilized styrenic polymer composition produced according to the method of claim 27.

34. A method of imparting increased thermal stability to styrenic polymers comprising:

(a) reacting a pre-formed styrenic polymer with a bifunctional cross-linking reagent selected from the group consisting of:

and

-continued wherein X and Y are independently selected from the group consisting of hydrogen, halo, hydroxy, nitro, alkyl, alkenyl, haloalkyl, hydroxyalkyl, alkyloxy, alkyloxyalkyl, alkylcarbonyl, alkylcarbonylalkyl, alkyloxycarbonyl, alkyloxycarbonylalkyl, alkylcarboxy, alkylcarboxyalkyl, substituted or unsubstituted phenyl or naphthyl (wherein the substitution is selected from the group consisting of halo, hydroxy, nitro, alkyl, alkenyl, haloalkyl), benzoate, nitrobenzoate, phosphate, alkylphosphate, phenylphosphate, diphenylphosphate, alkyl-diaryl-phosphate, carbonate, phenyl carbonate, inorganic acid esters, mesylate, and tosylate, at a first temperature wherein one of X or Y reacts with aromatic moieties in the pre-formed styrenic polymer to yield a functionalized styrenic polymer; and then (b) admixing the functionalized styrenic polymer with an acid catalyst capable of catalyzing Friedel-Crafts alkylation or acylation reactions, which thereby catalyzes reaction of the other of X or Y with remaining aromatic moieties in the functionalized polymer as a second temperature, wherein the second temperature is higher than the first temperature.

35. A functionalized, thermostabilized styrenic polymer composition produced according to the method of claim 34.

\* \* \* \* \*